United States Patent
Phillips

(10) Patent No.: US 7,287,363 B2
(45) Date of Patent: Oct. 30, 2007

(54) RIDING MOWER HAVING MULTIPLE CUTTING UNITS

(75) Inventor: David Lawrence Phillips, Willow Springs, NC (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/828,381

(22) Filed: Apr. 20, 2004

(65) Prior Publication Data

US 2005/0229567 A1    Oct. 20, 2005

(51) Int. Cl.
*A01D 75/30* (2006.01)

(52) U.S. Cl. .................. 56/7; 56/6; 56/228

(58) Field of Classification Search .......... 56/7, 56/6, 14.7, 14.9, 15.2, 15.9, 16.3, 134, 159, 56/228
See application file for complete search history.

(56) References Cited

U.S. PATENT DOCUMENTS

| | | | | |
|---|---|---|---|---|
| 1,263,209 A * | 4/1918 | Coldwell | ............... | 56/7 |
| 1,330,293 A | 2/1920 | Worhtington | | |
| 1,562,709 A * | 11/1925 | McNutt | ............... | 56/7 |
| 1,614,333 A | 1/1927 | Worthington | | |
| 1,957,079 A | 5/1934 | Ronning | | |
| 2,659,190 A | 11/1953 | Imbt | ............... | 56/7 |
| 2,677,224 A * | 5/1954 | Stegeman | ............... | 56/7 |
| 2,909,882 A * | 10/1959 | Lewis | ............... | 56/7 |
| 2,924,928 A * | 2/1960 | Rhoades et al. | ............... | 56/15.3 |
| 3,177,638 A | 4/1965 | Johnson | | |
| 3,410,063 A * | 11/1968 | Speiser | ............... | 56/7 |
| 3,429,109 A | 2/1969 | Heth et al. | ............... | 56/7 |
| 3,613,337 A * | 10/1971 | Akgulian et al. | ............... | 56/7 |
| 3,616,626 A | 11/1971 | Bramley et al. | | |
| 3,731,469 A * | 5/1973 | Akgulian et al. | ............... | 56/7 |
| 3,885,547 A * | 5/1975 | Doepke et al. | ............... | 123/198 D |
| 4,260,027 A * | 4/1981 | Langan | ............... | 172/45 |
| 4,341,059 A * | 7/1982 | Gerzanich | ............... | 56/15.8 |
| 4,384,443 A * | 5/1983 | Hoogstrate | ............... | 56/11.9 |
| 4,478,026 A | 10/1984 | Mullet et al. | ............... | 56/7 |
| 4,680,922 A | 7/1987 | Arnold | ............... | 56/7 |
| 5,297,378 A | 3/1994 | Smith | ............... | 56/7 |
| 5,533,325 A * | 7/1996 | Sallstrom et al. | ............... | 56/7 |
| 6,101,794 A * | 8/2000 | Christopherson et al. | ............... | 56/6 |
| 6,336,312 B1 * | 1/2002 | Bednar et al. | ............... | 56/6 |
| 6,397,568 B1 | 6/2002 | Negri | ............... | 56/7 |
| 6,481,191 B1 * | 11/2002 | Short | ............... | 56/7 |
| 6,684,616 B2 * | 2/2004 | Hornung | ............... | 56/16.7 |
| 2004/0055266 A1 | 3/2004 | Reimers et al. | ............... | 56/7 |

* cited by examiner

*Primary Examiner*—Thomas B. Will
*Assistant Examiner*—Alicia Torres

(57) ABSTRACT

A riding mower has multiple cutting units visible to the operator when mowing, and easily accessible for service and maintenance work. The riding mower chassis has a front end, a rear end, a left rail, a right rail, a pair of front wheels mounted at the front end, and a pair of rear wheels mounted adjacent the rear end. At least a portion of the left rail and right rail extend from under the operator module to define an uncovered area between the left rail and right rail adjacent the front end of the chassis. A first row of cutting units may be in front of the pair of front wheels, and a second row of cutting units behind the pair of front wheels. One of the cutting units in the second row may be positioned in the uncovered area between the left rail and the right rail.

16 Claims, 4 Drawing Sheets

RIDING MOWER HAVING MULTIPLE CUTTING UNITS

FIELD OF THE INVENTION

This invention relates to riding mowers, and more specifically to riding mowers having two rows of cutting units mounted thereto.

BACKGROUND OF THE INVENTION

Riding mowers for golf courses and athletic fields may have two rows of cutting units mounted to the chassis. Each cutting unit may cut a swath twenty or more inches in width so that multiple cutting units may cut grass in a path several feet or more in width. Examples of these riding mowers include lightweight fairway mowers available from Deere and Company of Moline, Ill.

These riding mowers may include a chassis with two driven wheels at or near the front end of the chassis, and two steered wheels at or near the back end of the chassis. An operator platform may be positioned near the front of the chassis, generally over the two front wheels. An internal combustion engine or other power supply may be positioned behind the operator platform. Arms may extend laterally from the chassis to support the cutting units.

Each cutting unit may be a cutting reel or rotary blade. Two or three cutting units may be positioned side by side in each of the two rows. The first or front row of cutting units may be positioned at or near the front of the chassis, in front of the front wheels and operator platform, so that the cutting units may be visible to the operator during mowing. The second or back row of cutting units may be positioned behind the front wheels, aligned laterally with the gaps between cutting units in the first or front row.

At least one of the cutting units may be completely or primarily underneath the operator platform and/or power supply. As a result, operating components on that cutting unit may not be visible when mowing, or visibility may be restricted or limited. For example, a cutting unit centrally mounted under the operator platform and/or power supply may not be visible while mowing. Similarly, the inboard ends of two cutting units in the second or back row may not be visible. A riding mower is needed having all cutting units visible to the operator when mowing.

Service access to cutting units that are partially or completely under the operator platform and/or power supply also may be difficult and/or restricted. Cutting units under the operator platform and/or power supply must be disconnected and pulled out from under the chassis to perform regular service including sharpening blades, adjusting reel-to-bedknife clearance, lubricating, etc. A riding mower is needed that will simplify and reduce the difficulty and time to access cutting units for service.

One or more cutting units mounted to these riding mowers may be designed to pivot and turn about a generally vertical axis when the riding mower turns. For example, pivoting mechanisms may provide the capability for each cutting unit to pivot several degrees or more on a vertical axis when the riding mower turns. This capability can add significant costs to the design and/or manufacture of the riding mower. The pivoting capability may help prevent or reduce the tendency of a cutting unit and/or its supporting wheels or casters to drag and/or scuff the turf when turning a corner. Non-pivoting cutting units positioned further in front of or behind the front axle may have a greater tendency to drag and/or scuff the turf. For example, non-pivoting cutting units positioned more than about 18 inches in front of or behind the front axle may have a greater tendency to drag and/or scuff the turf. (The distance to the front drive axle may be measured from the back end of cutting units in front of the front axle, and measured from the front end of cutting units behind the front axle.) A riding mower is needed having non-pivoting cutting units that do not drag and/or scuff the turf when cornering.

Riding mowers with two rows of cutting units may have difficulty climbing steep grades. For example, these riding mowers may lack sufficient weight over the front drive wheels. All-wheel drive systems may be employed to improve the traction, but are significantly more expensive and may increase the complexity and maintenance requirements, when compared to two-wheel drives. Additionally, all-wheel drive systems may have a tendency to tear up turf when making tight turns. A riding mower is needed with improved climbing capabilities without requiring all-wheel drive.

Riding mowers may be limited to cutting units having widths of about 25 inches or less. For example, riding mowers may lack adequate horsepower to pull wider cutting units, especially up steep grades. Or riding mowers may lack sufficient ground clearance to carry wider cutting units in the transport mode, and/or may have excessive width when carrying the wider cutting units. A riding mower is needed for cutting units greater than about 25 inches in width.

SUMMARY OF THE INVENTION

A riding mower has all cutting units visible to the operator when mowing, and easily accessible for service and maintenance work. The riding mower has a chassis with a front end, a rear end, a left rail, a right rail, a pair of front wheels mounted at the front end, and a pair of rear wheels mounted adjacent the rear end. An operator module may be mounted on the chassis, such that at least a portion of the left rail and right rail extending from under the operator module define an uncovered area between the left rail and right rail adjacent the front end of the chassis. A first row of cutting units may be in front of the pair of front wheels, and a second row of cutting units behind the pair of front wheels. One of the cutting units in the second row may be positioned in the uncovered area between the left rail and the right rail.

The riding mower may have rear wheels that are driven and steered, and cutting units positioned in front of and behind the smaller front wheels. As a result, the cutting units may be positioned sufficiently close to the front axles so that the cutting units may not be required to pivot on a vertical axis to avoid dragging and/or scuffing the turf when cornering.

The riding mower may have a power supply centered primarily behind the rear axle and tires. With the weight centered behind the rear axle and tires, traction to the driven and steered wheels may be improved, allowing the riding mower to effectively climb steep grades and use larger cutting units.

DESCRIPTION OF THE PREFERRED EMBODIMENT

Figure 1:
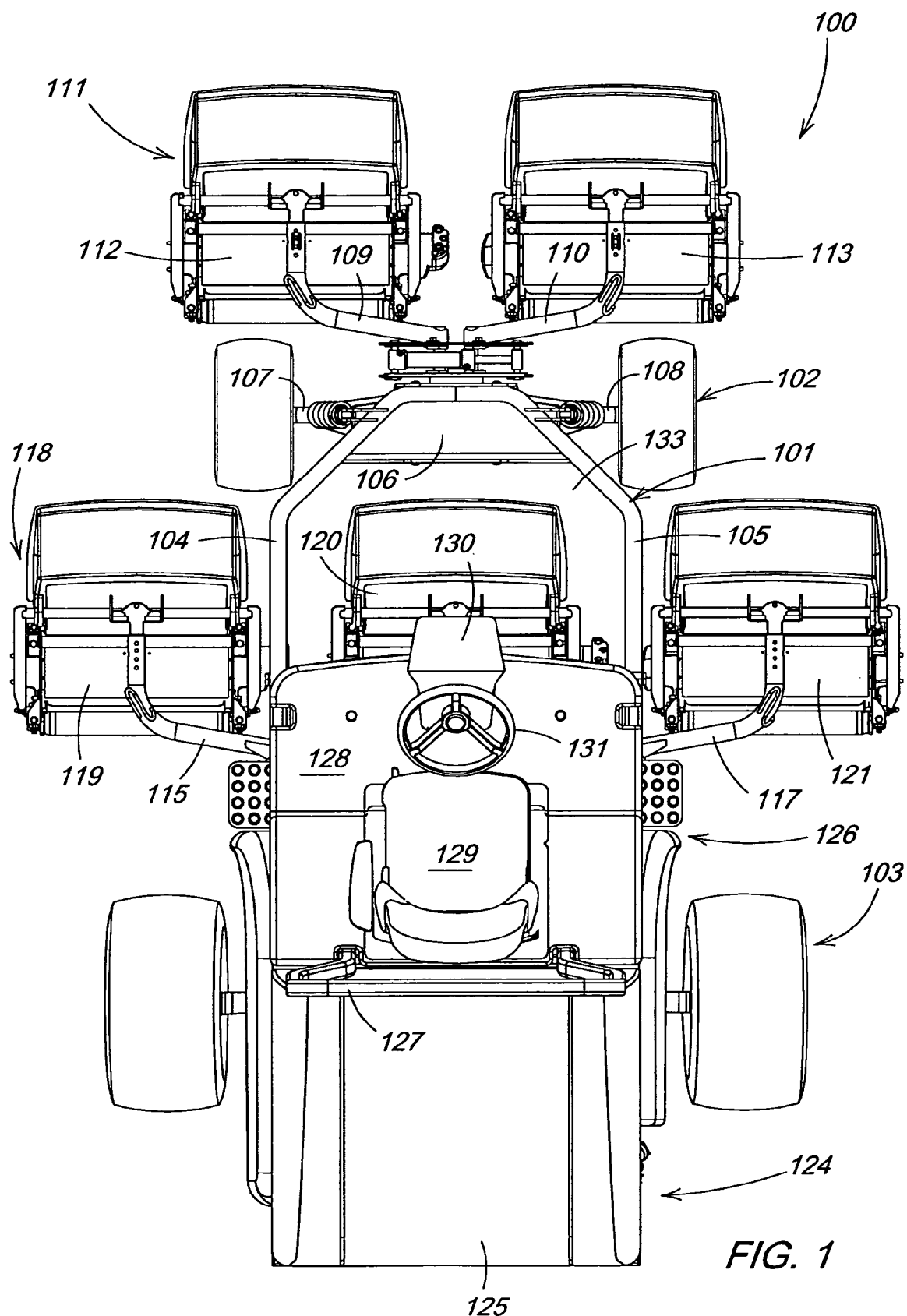
FIG. 1 is a top view of a riding mower according to a first embodiment of the invention.
Figure 2:
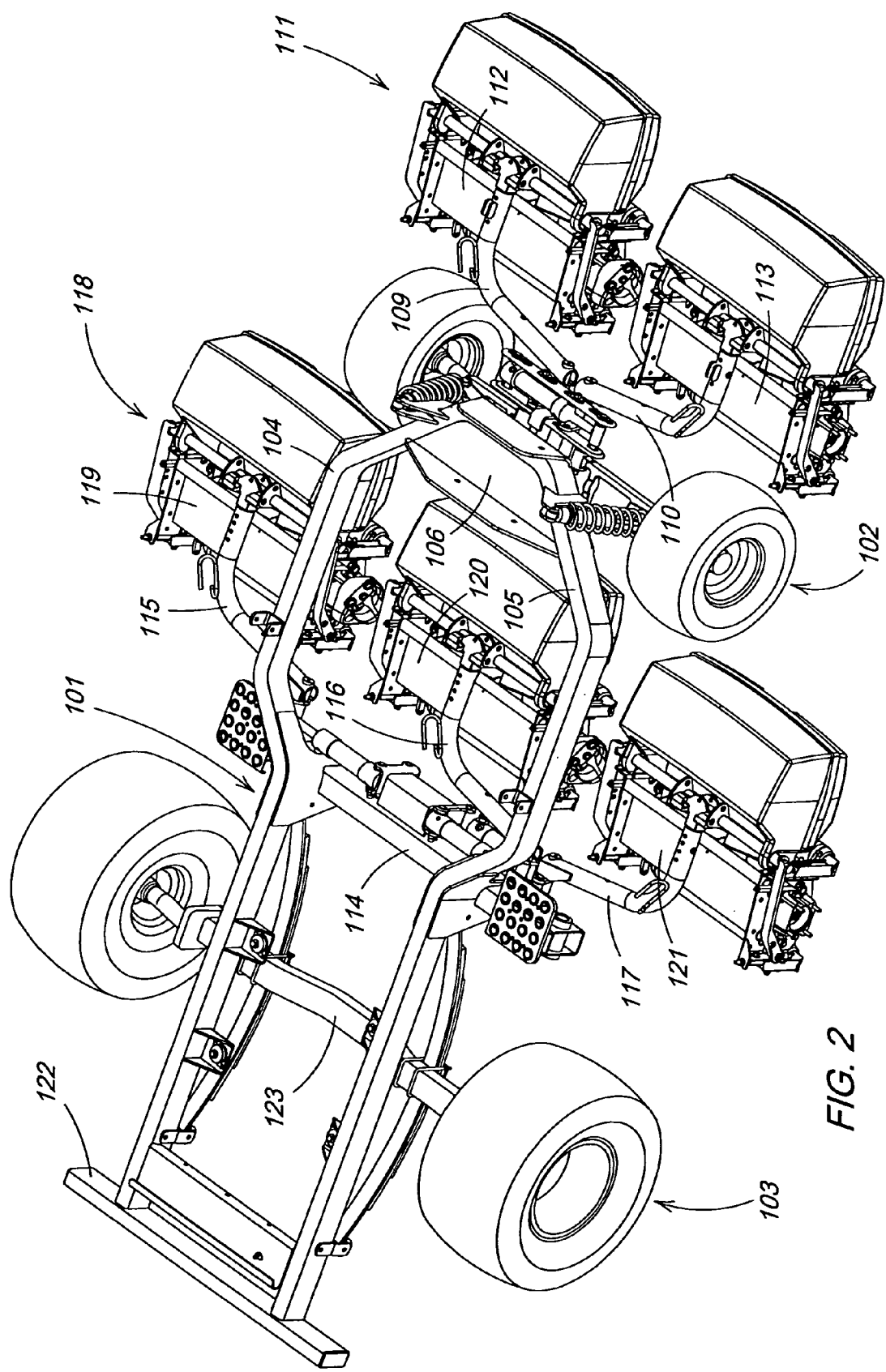
FIG. 2 is a perspective view of a riding mower according to the first embodiment, without the operator module and power supply.
Figure 3:
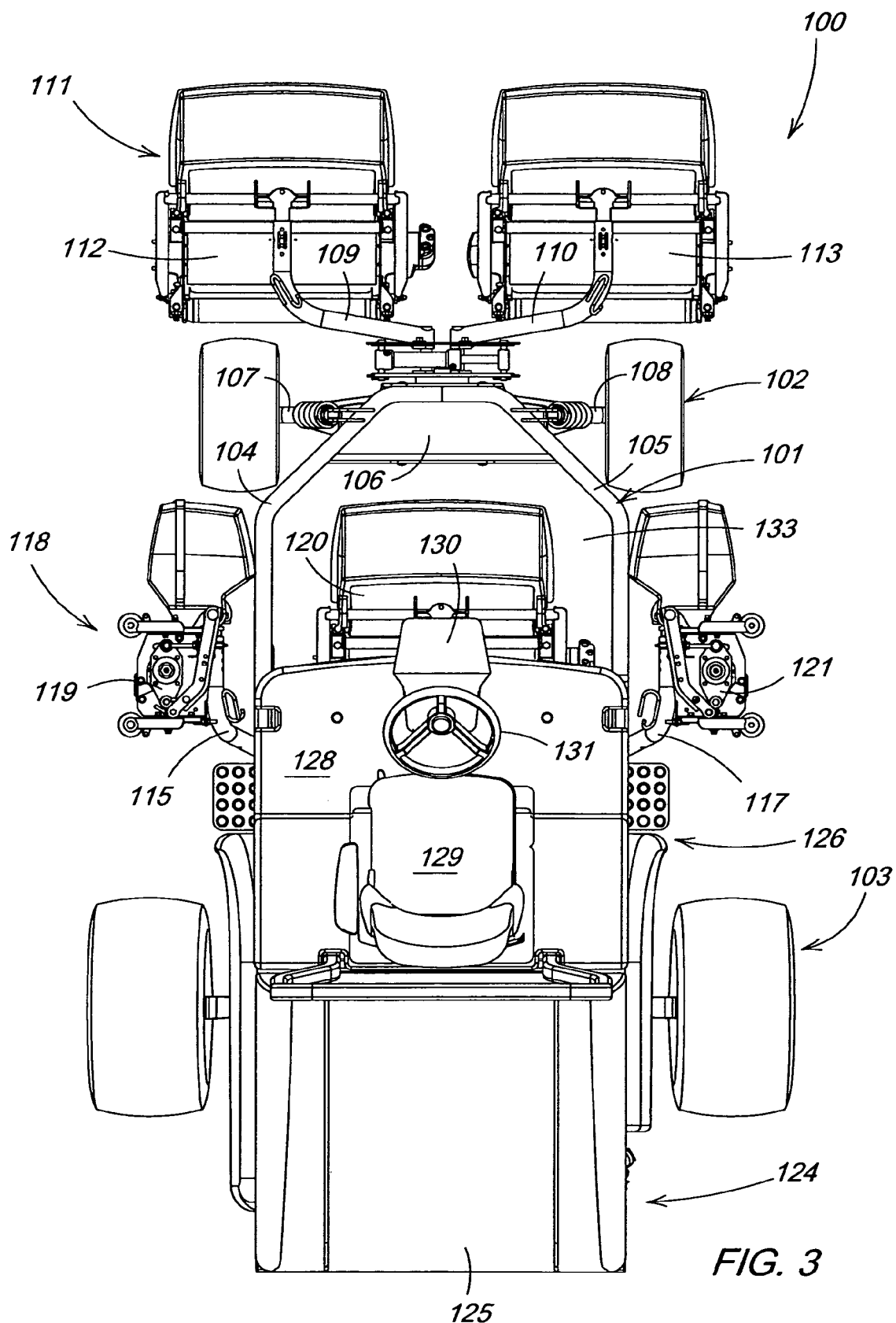
FIG. 3 is a top view of a riding mower according to a first embodiment, with two outside cutting units in the raised position for transport.

FIGS. 1, 2 and 3 show a first embodiment of riding mower 100 which includes chassis 101 supported by front wheels 102 and rear wheels 103 for movement over the ground. In one embodiment, chassis 101 may be an all-welded ladder type tubular construction. The chassis may include left and right side rails 104, 105 which may be rectangular tubes. The side rails may be generally parallel and may be spaced apart adjacent the front end of the riding mower so that cutting unit 120 may be positioned between the side rails. For example, for a cutting unit having a width of about 30 inches, the side rails adjacent the front end should be spaced apart greater than about 30 inches, and preferably between about 41 inches and about 43 inches.

In one embodiment, the space between left and right side rails 104, 105 adjacent the front end of the chassis may be greater than the space between the left and right side rails adjacent the back or rear end of the chassis. The left and right side rails adjacent the back or rear end of the riding mower may be spaced sufficiently close to support power supply 124 between them, such as an internal combustion engine, and rear wheels 103 may be outboard of the engine. For example, the spacing between the left and right side rails adjacent the back or rear end of the riding mower may be less than about 36 inches.

In one embodiment, chassis 101 may include front lateral member 106 at the front end of the chassis. The front lateral member may be a plate formed into a channel shape. The front lateral member may provide mounting points for left front axle 107 and right front axle 108, and for front lift arms 109, 110 for mounting first or front row 111 of cutting units 112, 113.

FIG. 2 shows one embodiment of chassis 101 with the operator module and power supply removed. The chassis may include center lateral member 114 which may be two channels welded into a box construction, and attached to the side rails using formed gusset plates. Pivot tubes may be welded to the center lateral member to provide location and support for back lift arms 115, 116, 117 which support second or back row 118 of cutting units 119, 120, 121. The lift arms may be movable to at least two distinct positions, allowing multiple lift arm configurations for different attachments.

In one embodiment, the chassis further may include rear lateral member 122 at the rear end of the chassis. The rear lateral member may be rectangular tubing providing sufficient structural support for a rear hitch. Various brackets may be welded to the chassis to provide mounting locations for the power supply, cooling system, control valves and plumbing, lift cylinder attachment, and the operator's module.

Referring again to FIG. 1, in a first embodiment, front wheels 102 may not be driven by the power supply or steered. Left front axle 107 and right front axle 108 may be independently mounted to the chassis at the front end of the chassis using coil springs over shock absorbers to provide damping and suspension sufficient for road speeds of up to about 40 kph (25 mph). The axles may be of cast ductile iron in an A-shape, with integral mounting points for the pivots and for the lower shock absorber mounts. The ends of the castings may be turned to provide the proper mounting and location for the wheel hubs, bearings and seals. In an alternative embodiment, front wheels may be driven by the power supply and/or steered.

In one embodiment, riding mower 100 may be rear-steering and rear-wheel drive. Thus, rear wheels 103 may be used for primary drive and steering. The rear axle may be mounted to the chassis adjacent the rear end of the chassis using leaf springs and shock absorbers to allow for road speeds up to about 40 kph (25 mph).

In one embodiment, an electronically controlled hydrostatic pump may drive two fixed displacement motors, one motor connected to each rear wheel. The control signal may be provided by a foot operated potentiometer, which may set speed and direction through an electronic controller on the pump. Optionally, the control module may be programmed for acceleration rate, deceleration rate, maximum transport speed, and maximum mowing speed.

In an alternative embodiment, the rear wheels may be electrically driven and steered. For example, a diesel-electric riding mower may include a generator mounted to the engine, to drive electric motors connected to the rear wheels. In another alternative embodiment, the front wheels, rather than the rear wheels, may be steered.

In one embodiment, the rear wheels and tires may be larger than the front wheels and tires. For example, each rear wheel may have a diameter of greater than about 12 inches, and each rear tire may have a diameter of greater than about 24 inches, while each front wheel may have a diameter of less than about 10 inches, and each front tire may have a diameter of less than about 20 inches. Additionally, the track width of the rear wheels and tires may be greater than the track width of the front wheels and tires.

Riding mower 100 may have a power supply 124 supported on the chassis, located behind the operator. The power supply may be any type known in the art, such as a gasoline-powered internal combustion engine, battery or other electrical power supply, fuel cell or hybrid. The choice of power supply may be based, at least in part, on noise requirements and the size of cutting units. In general, the power supply may provide between about 30 horsepower and about 100 horsepower.

In one embodiment, the power supply may be positioned on the chassis between the side rails so that the power supply extends at least partially behind rear axle 123 and rear wheels 103. The rear end of the chassis may extend behind the rear wheels sufficiently to support at least some of the power supply. Preferably, the power supply may have a weight distribution centered behind the rear axle and the rear wheels. The weight of the power supply may be distributed primarily over the rear drive axle, to enhance the driving and steering capabilities of the riding mower, especially on steep grades.

In one embodiment, the power supply may be enclosed by hydraulic and/or fuel tanks on the sides. The tanks may be shaped and/or molded plastic and may be dimensioned to provide adequate clearance for the rear wheels to turn to their maximum position. The top of each tank may be positioned to close the gap under the hood shoulder to seal in engine noise, and may include a curved front to follow the line of the bottom of the operator module. Filler openings may be in the top of each tank and may be covered when the hood is closed. The tanks may be bolted to the chassis at the bottom, and may be supported at the top using stiffener rods.

In one embodiment, the power supply may be enclosed by hood 125. The hood may have air filtration capability on the top and/or rear sides. For example, the hood may be a hollow, molded plastic design, having top and rear sides that are cut out and screened to provide a passage for air intake while blocking unwanted particles. The hood may pivot at the bottom rear to provide service access to the power supply.

Operator module 126 may be mounted over the chassis immediately behind and above the second or back row of cutting units. In one embodiment, the operator module may include a structural tubing framework attached to the chassis using steel sleeved rubber bushings mounted in the framework and pivoting in brackets welded to the chassis. The pivots may be located at the at the lower front of the module and may allow the entire module to pivot up and forward, exposing the transmission, PTO, lift valves, and associated plumbing and wiring for service purposes. The module frame may rest on rubber pads under the rear, and may be loosely latched at the lower rear to allow cushioning yet provide restraint from pivoting unless the latch is released. The operator module also may include rollover protection structure 127, floor 128, adjustable seat 129 mounted to the module frame, steering column 130 bolted to the floor, steering wheel 131 which may be pivotally mounted and sealed to the top of the column, and controls for operation of machine functions. Optionally, a cab or enclosure may be installed to cover the operator platform.

Now referring to FIG. 3, riding mower 100 is shown with outside cutting units 119, 121 raised (and rotated) to a full vertical position. In the raised position, cutting units 119, 121 may be within the track of the rear wheels and tires. Each cutting unit may be mounted directly to a generally L-shaped, horizontally-extending lift arm. During mowing, each lift arm may pivot with respect to the chassis and the cutting unit to allow the cutting unit to independently float with the ground contour. Thus, each cutting unit may pivot on one or more horizontal axes. In the transport mode, the lift arms may raise the cutting units using hydraulic or electric devices.

In one embodiment, the cutting units may be cutting reels having blades that rotate about a generally horizontal axis. The first or front row may have two side-by-side cutting units 112, 113 in front of front wheels 102. The first or front row of cutting units may provide a width of cut greater than the track width of front wheels 102. The second or back row may have three side-by side cutting units 119, 120, 121 behind the front wheels. The second or back row of cutting units may provide a width of cut greater than the track width of rear wheels 103. Cutting unit 120 may be aligned with a gap between cutting units 112, 113. Optionally, one or more cutting units may include a grass catching or collecting component.

Each cutting unit may be visible to the operator, including cutting unit 120 positioned between left rail 104 and right rail 105. The left rail and right rail define uncovered area 133 where cutting unit 120 may be positioned. As used herein, the term "uncovered area" means the area bounded by the chassis that is not covered by operator module 106, power supply 124 or hood 125. In one embodiment, the uncovered area may be at least about 5 square feet in size. The uncovered area also may include at least about the first 24 inches of each of the left and right rails which extend from the front edge of the operator module to the left and right front axles.

The distance between each cutting unit and the left and right front axles may be reduced or minimized to reduce the tendency of cutting units to drag or scuff the turf. This distance may be measured from either the left or right front axle to the end of the cutting unit closest to the axle. For example, each cutting unit may be positioned less than about 18 inches in front of or behind the left and right front axles. This may be done by positioning the cutting units in front of and behind the smaller diameter front wheels. By reducing or minimizing the distance between each cutting unit and the front axle, it may not be necessary for the cutting unit to pivot on a vertical axis.

In one embodiment, cutting units having a width of 25 inches or more may be employed in riding mower 100. For example, the riding mower may provide sufficient traction on steep grades to pull cutting units of 25 inches or greater width. Additionally, riding mower may have sufficient ground clearance to lift and raise the larger cutting units in the transport mode inside the track width of rear wheels 103.

Figure 4:
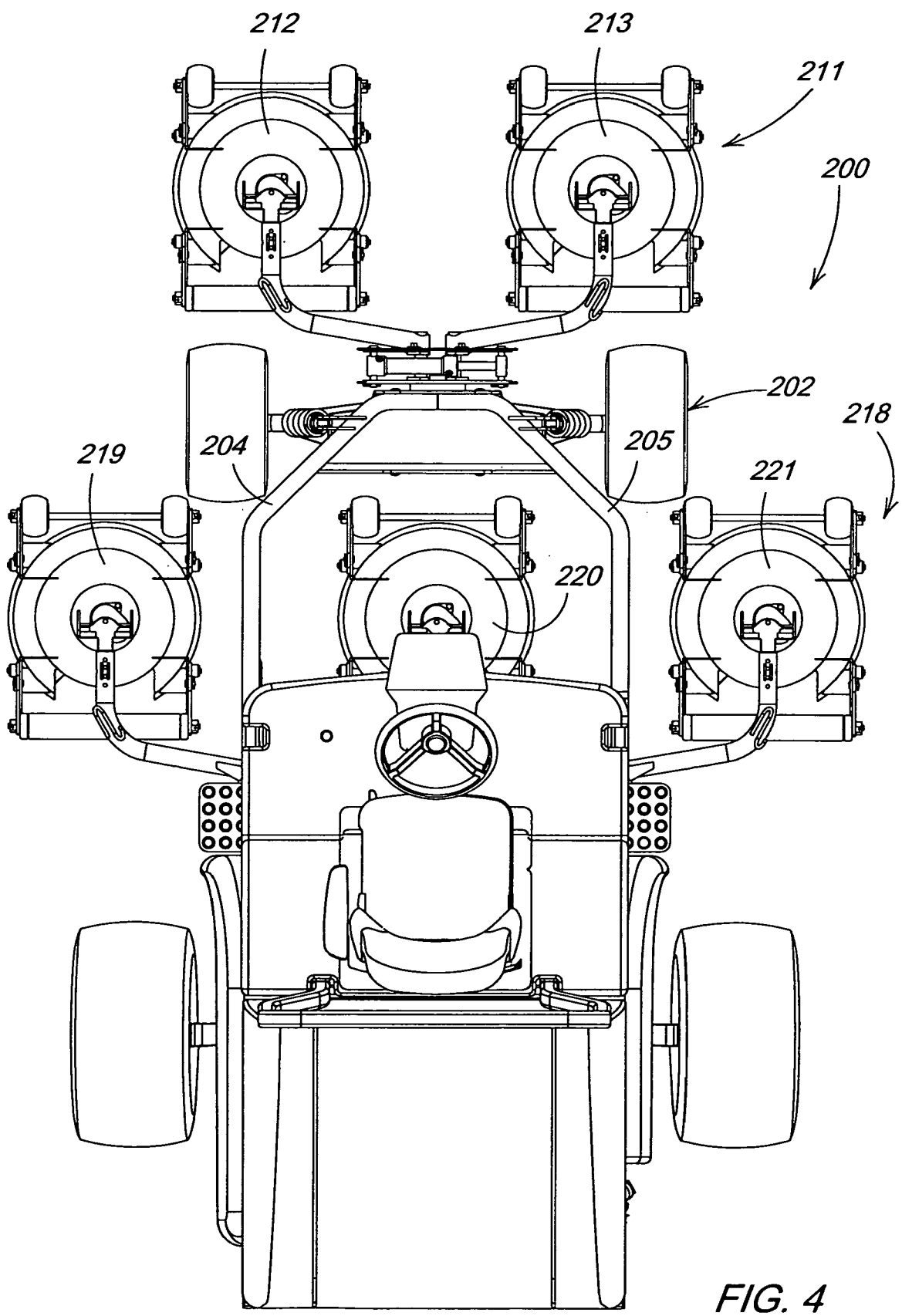
FIG. 4 is a top view of a riding mower according to a second embodiment of the invention.

Now referring to FIG. 4, a second embodiment is shown in which riding mower 200 may have cutting units that are rotary cutting blades on spindles with generally vertical axes under decks. The first or front row 211 may have two side-by-side cutting units 212, 213 in front of front wheels 202. The second or back row 218 may have three side-by side cutting units 219, 220, 221 behind the front wheels. Cutting unit 220 may be positioned between left rail 204 and right rail 205. In other respects, the second embodiment may be the same as the first embodiment shown in FIGS. 1, 2 and 3.

Having described the preferred embodiment, it will become apparent that various modifications can be made without departing from the scope of the invention as defined in the accompanying claims.

The invention claimed is:

1. An apparatus comprising:
a chassis having a front end, a rear end, a left rail, a right rail, a pair of non-driven front wheels and a pair of front axles independently mounted at the front end and having a track width, and a pair of rear wheels driven by a power supply at least partially behind the pair of rear wheels, the pair of rear wheels mounted adjacent the rear end and having a track width greater than that of the pair of front wheels;
an operator module mounted on the chassis in front of the power supply, at least a portion of the left rail and right rail extending from under the operator module to define an uncovered area in front of the operator module between the left rail and right rail;
a first row of two cutting units in front of the pair of front axles and mounted to horizontally extending lift arms; and
a second row of three cutting units behind the pair of front axles and in front of the operator module and power supply, a center cutting unit in the second row having a width less than the distance between the left rail and the right rail; the other two cutting units in the second row mounted to horizontally extending lift arms that pivot to lift and rotate the two cutting units to a full vertical transport position inside the track width of the pair of rear wheels.

2. The apparatus of claim 1 wherein the cutting units are reels rotating on generally horizontal axes.

3. The apparatus of claim 1 wherein the cutting units are rotary blades rotating on generally vertical axes.

4. The apparatus of claim 1 wherein the power supply is an internal combustion engine.

5. The apparatus of claim 1 wherein the pair of rear wheels are steered.

6. The apparatus of claim 1 wherein the uncovered area is at least 5 square feet in size.

7. The apparatus of claim 1 wherein each of the pair of front wheels are smaller in diameter than each of the pair of rear wheels.

8. The apparatus of claim 1 wherein the cutting units are non-pivotable on a vertical axis.

9. An apparatus comprising:
   a ladder type chassis having a left rail, a right rail, a front end and a rear end;
   a pair of non-driven front wheels mounted to a pair of front axles mounted to the front end of the chassis, the front wheels having a track width;
   a first row of two cutting units mounted to pivotable arms extending from the front end of the chassis so that each cutting unit in the first row is in front of the pair of front axles;
   a second row of three cutting units mounted to pivotable arms extending from the chassis so that each cutting unit in the second row is behind the pair of front axles;
   a center cutting unit in the second row positioned between and having a width less than the distance between left rail and the right rail;
   an operator module mounted to the chassis at least primarily behind the second row of cutting units;
   a pair of rear wheels mounted to the chassis adjacent the rear end of the chassis and behind the second row of cutting units; the rear wheels having a track width greater than the track width of the front wheels;
   the pivotable arms in the second row movable to at least two distinct positions; one of the positions raising and rotating two of the cutting units to a full vertical position within the track width of the rear wheels; and
   a power supply mounted to the chassis adjacent the rear end of the chassis and at least primarily behind the operator module and the pair of rear wheels.

10. The apparatus of claim 9 wherein a portion of each rail is under at least one of the operator module and the power supply, a portion of each rail adjacent the front end of the chassis being uncovered by either of the operator module and the power supply.

11. The apparatus of claim 10 wherein the left rail and right rail are generally parallel to each other and are spaced farther apart from each other adjacent the front end of the chassis than the rear end of the chassis.

12. The apparatus of claim 9 further comprising a hood over the power supply, the hood having a screened air intake.

13. The apparatus of claim 9 wherein the pair of front wheels are non-steered.

14. The apparatus of claim 9 wherein each cutting unit is pivotable on at least one horizontal axis.

15. An apparatus comprising:
   a chassis on which an operator module is mounted in front of a power supply, the chassis including a pair of rails and being partially covered by the operator module and the power supply;
   a front pair of non-driven wheels mounted on a front pair of axles independently mounted to the chassis, and a pair of rear wheels driven by the power supply; the rear pair of wheels having a greater track width than the front pair of wheels; and
   a first row and a second row of cutting units mounted on arms extending laterally from the chassis, the first row including two cutting units less than about 18 inches in front of the front pair of axles and the second row including a center cutting unit and two outside cutting units less than about 18 inches behind the front pair of axles; each of the cutting units in the second row being in front of the operator module and the power supply in a mowing position, the center cutting unit in the second row being positioned between the pair of rails in the mowing position, the outside cutting units being within the track width of the rear wheels if the outside cutting units are raised and rotated to a transporting position.

16. The apparatus of claim 15 wherein the power supply is primarily behind the rear pair of wheels to drive the rear wheels.

* * * * *